Jan. 5, 1937.  W. C. WRIGHT  2,066,379
IMPREGNATING APPARATUS
Original Filed April 13, 1931  10 Sheets-Sheet 1

Inventor
Wallace C. Wright
by James R. Hodder
Attorney

Jan. 5, 1937.   W. C. WRIGHT   2,066,379
IMPREGNATING APPARATUS
Original Filed April 13, 1931   10 Sheets-Sheet 5

Inventor
Wallace C. Wright
by James R. Hodder
Attorney

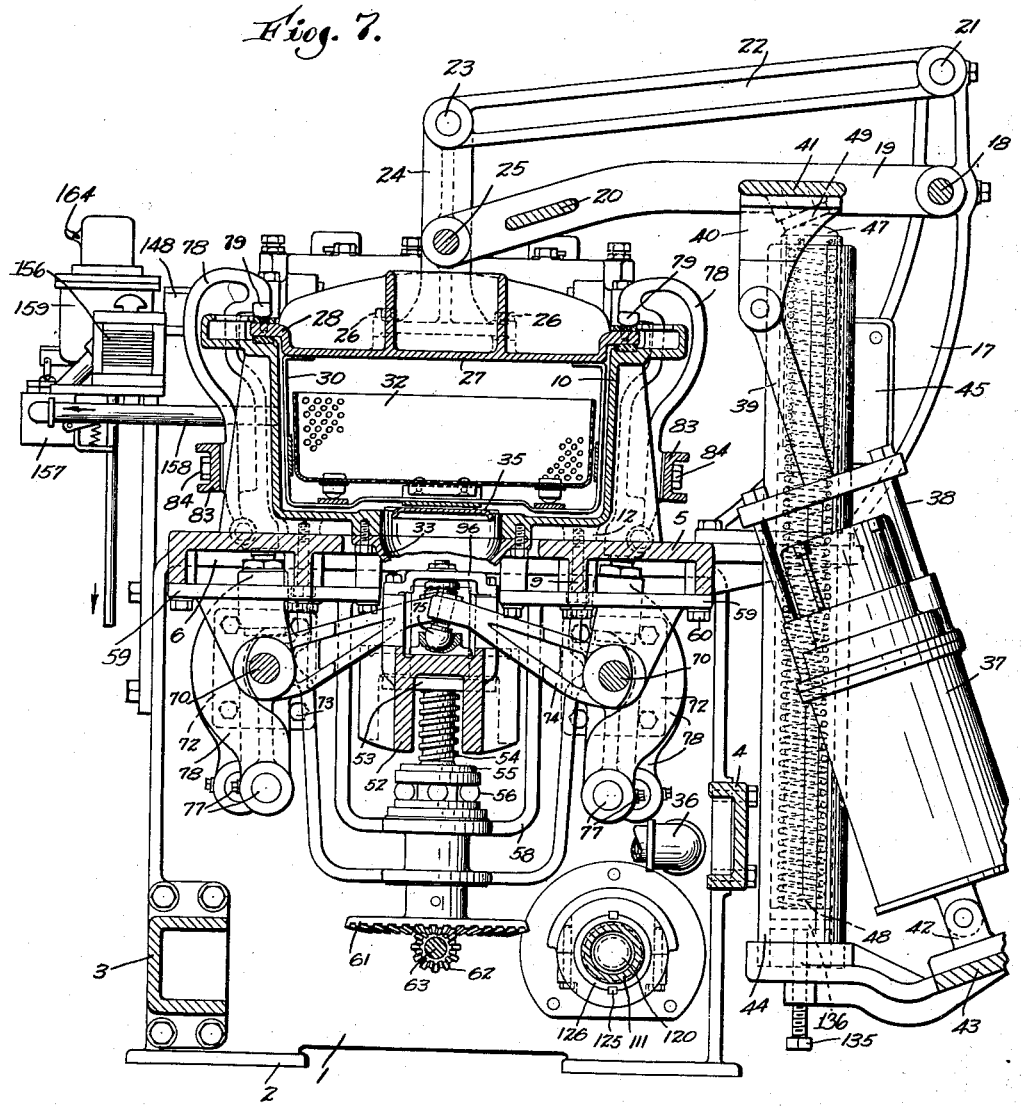

Jan. 5, 1937. W. C. WRIGHT 2,066,379
IMPREGNATING APPARATUS
Original Filed April 13, 1931 10 Sheets-Sheet 8
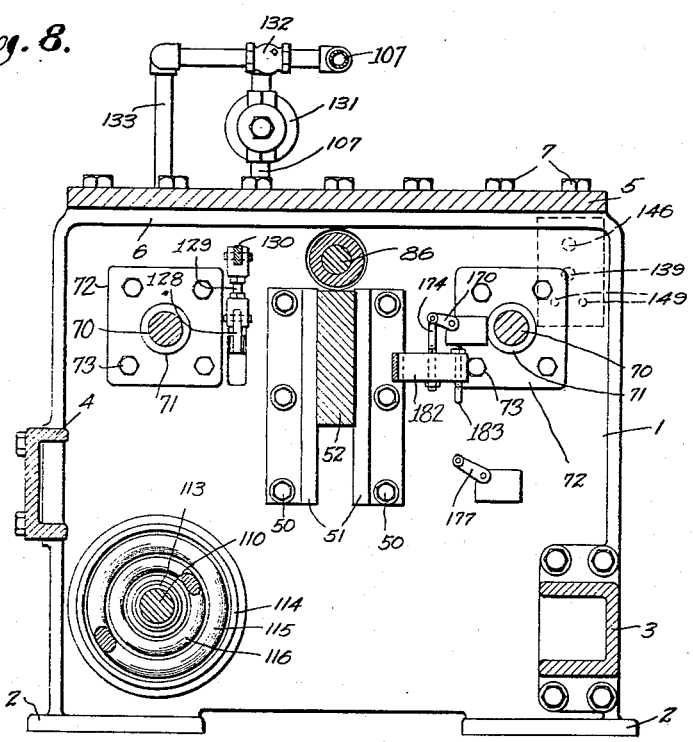
Inventor
Wallace C. Wright
by James R. Hodder
Attorney

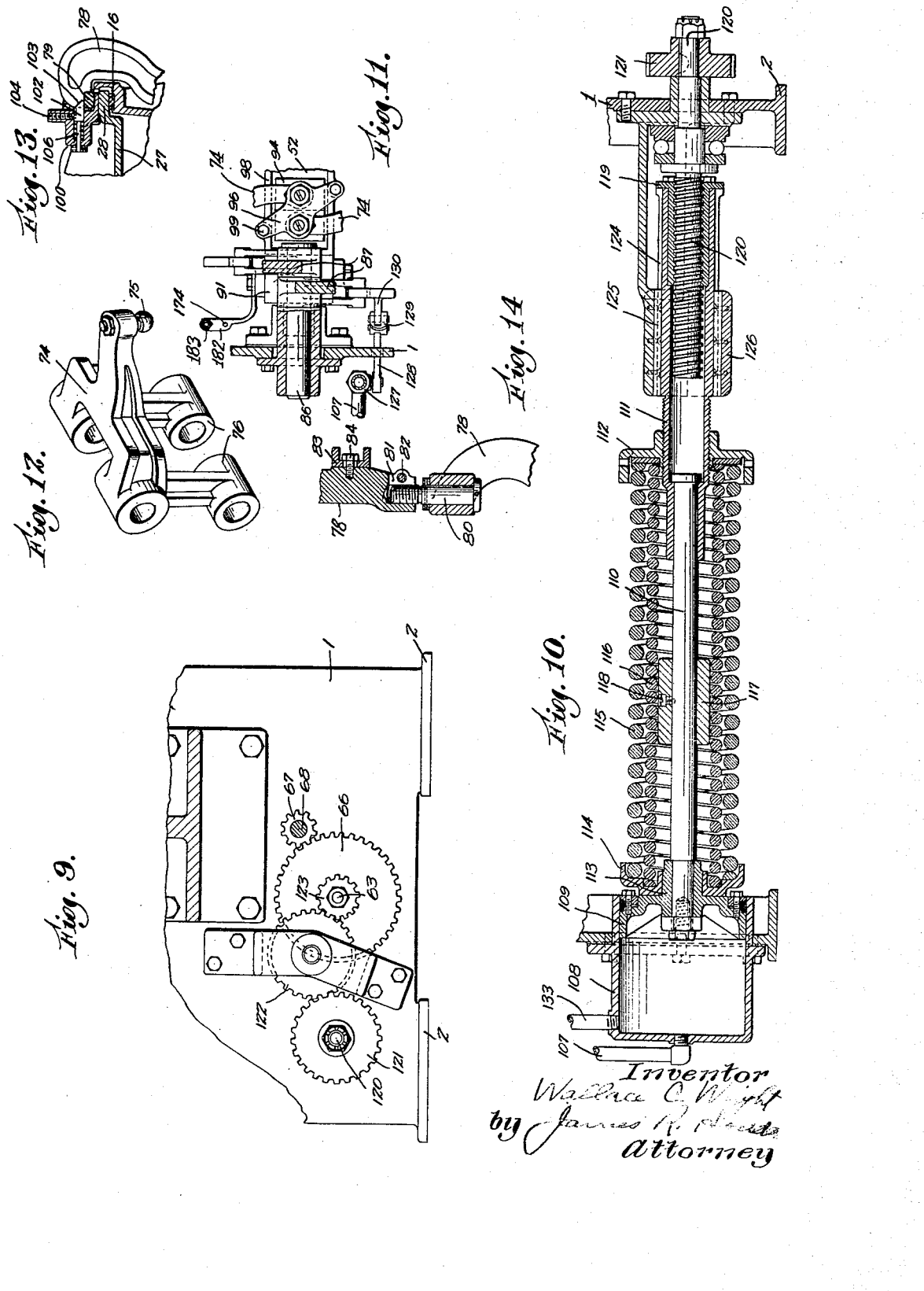

Patented Jan. 5, 1937

2,066,379

UNITED STATES PATENT OFFICE 2,066,379

IMPREGNATING APPARATUS

Wallace C. Wright, Brookfield, N. H., assignor, by mesne assignments, to United Shoe Machinery Corporation, Boston, Mass., a corporation of New Jersey Application April 13, 1931, Serial No. 529,705
Renewed February 3, 1936

21 Claims. (Cl. 91—46)

This invention relates to apparatus for treating articles with a fluid in a pressure-tight receptacle in which the effect of the fluid may be varied by altering the pressure thereof. The invention is herein disclosed as embodied in an apparatus designed for tempering leather soles with a liquid in a short space of time to condition them for various operations to which they are to be subjected before and after they are attached to shoes.

The so-called "mulling" of leather soles at present being practiced in the manufacturing of shoes is the common process by which the soles are tempered with water at atmospheric pressure. To obtain uniform and satisfactory tempering by that process requires several days' time, since the grain substance of sole-leather is highly resistant to penetration by water. Consequently, although the fleshy substance of the leather will absorb water rapidly by capillary action alone, thorough mulling requires packing the soles in damp cloths or in a humidifying cabinet for several days to develop the necessary temper of the grain substance. Even when great care is used in mulling, the fleshy substance may become too sodden with moisture, and if the grain surfaces become stained with mold, residual tanning chemicals or dirt, and if such stains remain for days they too often become permanent, to the detriment of shoe-bottom finishing. Then, too, the long time required for mulling retards production, increases the cost of manufacture, and militates against coordination of progress in the various departments of shoe manufacture.

On the other hand, it has been demonstrated that better results may be obtained in from one to five minutes by raising the pressure of the water to a high degree while the soles are immersed therein, the effect of high pressure being to drive the water into and through the pores of the leather and thereby expel the air from the pores. For this purpose pressures ranging from one hundred to five hundred pounds per square inch, according to the density of the leather, have been found to be satisfactory, but since pressures as high as those mentioned would, if continued too long, render soles too sudden for use it is highly important to guard against prolonging the high-pressure treatment, even slightly, beyond the period of time necessary.

In view of these conditions an object of the present invention is to provide an improved apparatus in which pervious articles such as leather soles may be quickly and uniformly tempered in a liquid subjected to a high tempering pressure maintained for a predetermined length of time and then relieved without dependence upon human intervention to relieve the pressure when the allotted time has expired.

Another object is to provide an improved apparatus capable of automatic operation to remove the tempered work from the tempering liquid as soon as may be after the allotted period of high-pressure treatment has expired.

To fulfill these and other objects the apparatus herein illustrated and described comprises an automatic organization including a pressure-sustaining receptacle in which the tempering treatment may be administered, for example in accordance with the method set forth in United States Letters Patent No. 2,005,765, granted June 25, 1935 on my application filed as a continuation in part of this present application.

The illustrated receptacle has a retractory closure to provide for introducing and removing the work which may be carried in a foraminous container suspended from the closure. The apparatus also includes power-operated mechanism for carrying the closure to and from its operative position on the receptacle, power-operated mechanism for securing and releasing the closure, power-operated mechanism for raising and relieving the pressure of the water in the receptacle, and automatic controls by which the several power-operated mechanisms and other devices are brought into operation in a certain sequence. One of the automatic controls is a timing device by which the length of the pressure-tempering period is governed and by which all subsequent operations are postponed accordingly.

As herein illustrated, a source of water under pressure is provided with a pressure-sustaining valve for supplying water to the treatment receptacle. This valve is automatically operated first to admit enough water to fill the receptacle and thereafter to shut off the supply and prevent reverse flow, under greater tempering pressure, from the receptacle toward the source of supply, its opening movement being caused by placing the closure on the receptacle, and its closing movement being caused by the water accumulated in the receptacle.

The various power-operated elements and controls therefor are so organized in conjunction with electrical activating circuits that a complete cycle of operations may be brought about automatically in consequence of merely pressing a button in an electrical starting circuit. Briefly stated, the following operations occur in the order of their recital. When the aforesaid button is pressed (it may be released immediately) the closure is carried to its operative position on the receptacle; a valve opens to supply water to the receptacle; when the receptacle is full the supply valve closes, an automatic timing device becomes active and a power-operated mechanism secures the closure tightly and raises the pressure of the water in the receptacle to a certain predetermined degree which it maintains for a certain length of time measured by the automatic timing device; the tempering pressure in the receptacle is then relieved; the closure is released; and finally the closure and the tempered work supported thereby are carried away from the receptacle to a point where they remain until an attendant removes the tempered work. When all operating current is turned off from the apparatus the closure descends to the receptacle where it rests until operation of the apparatus is to be resumed.

Referring to the drawings,

Fig. 7 is a vertical section through the structure intersected by line 7—7 of Fig. 2, the parts being in their operative positions as when the work is undergoing treatment;

Fig. 8 is a vertical section of the structure intersected by line 8—8 of Fig. 1, and includes various automatic controls whereby certain steps in a cycle of operations are initiated or terminated as the case may be;

Fig. 9 is an elevation of transmission gearing, the direction of view being indicated by line 9—9 in Fig. 2;

Fig. 10 is a vertical section through power-operated mechanism by which high pressure of the treating liquid is developed and relieved, the direction of the view being indicated by line 10—10 in Fig. 4;

Fig. 11 is a horizontal section of mechanism within the range of line 11—11 of Fig. 2;

Fig. 12 is a perspective view of one of a plurality of toggle members by which the closure is secured to the treatment receptacle;

Fig. 13 is a vertical section through one of a plurality of devices by which the closure is raised incidentally to being released from the receptacle, the location of the parts being indicated by line 13—13 in Fig. 3;

Fig. 14 is a vertical section through an adjustable connection of one of the toggle mechanisms by which the closure is secured to the receptacle, the direction of the view being indicated by line 14—14 in Fig. 3;

Figure 1:
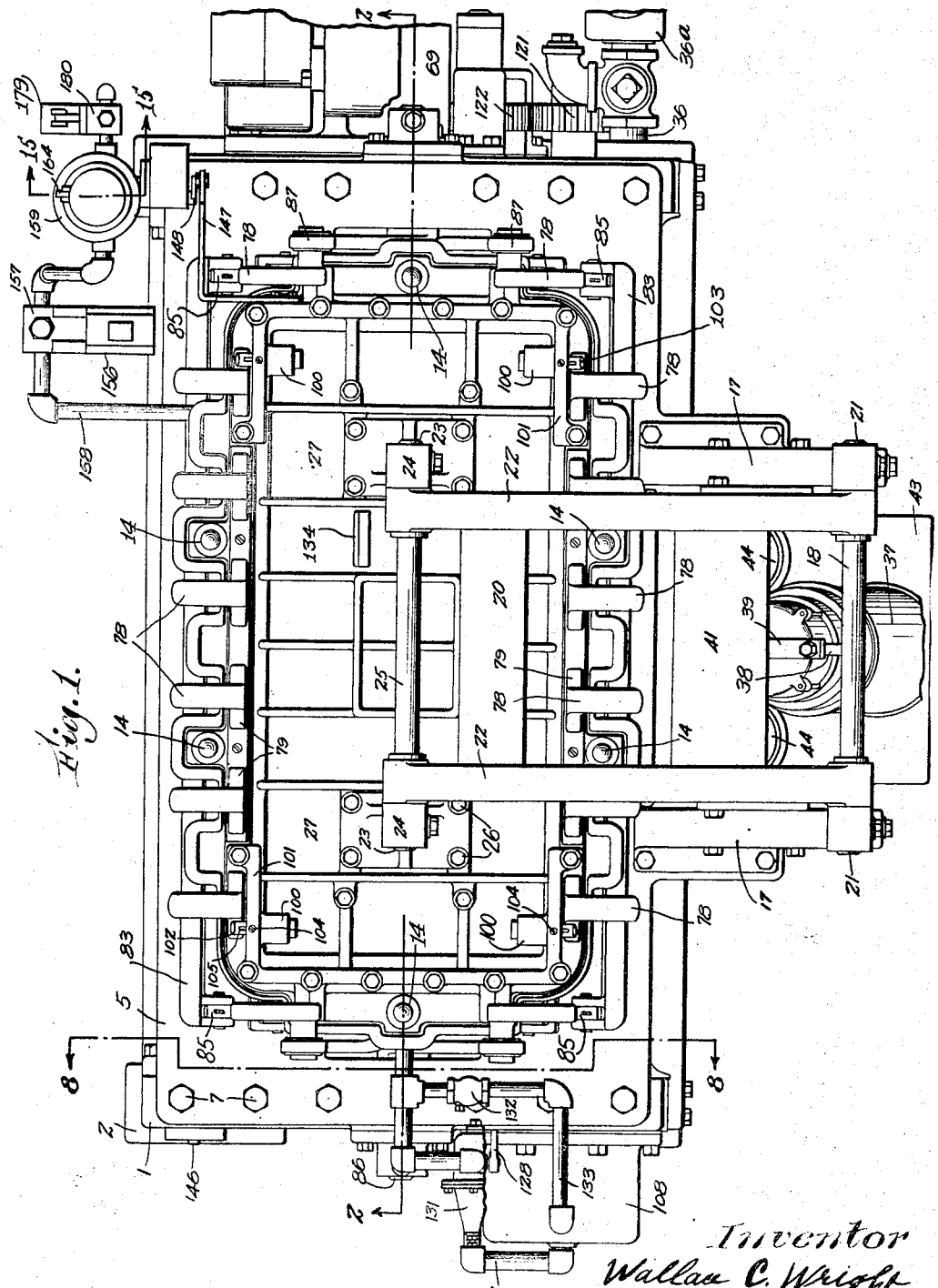
Fig. 1 is a top-plan view of a machine embodying the present invention.
Figure 16:
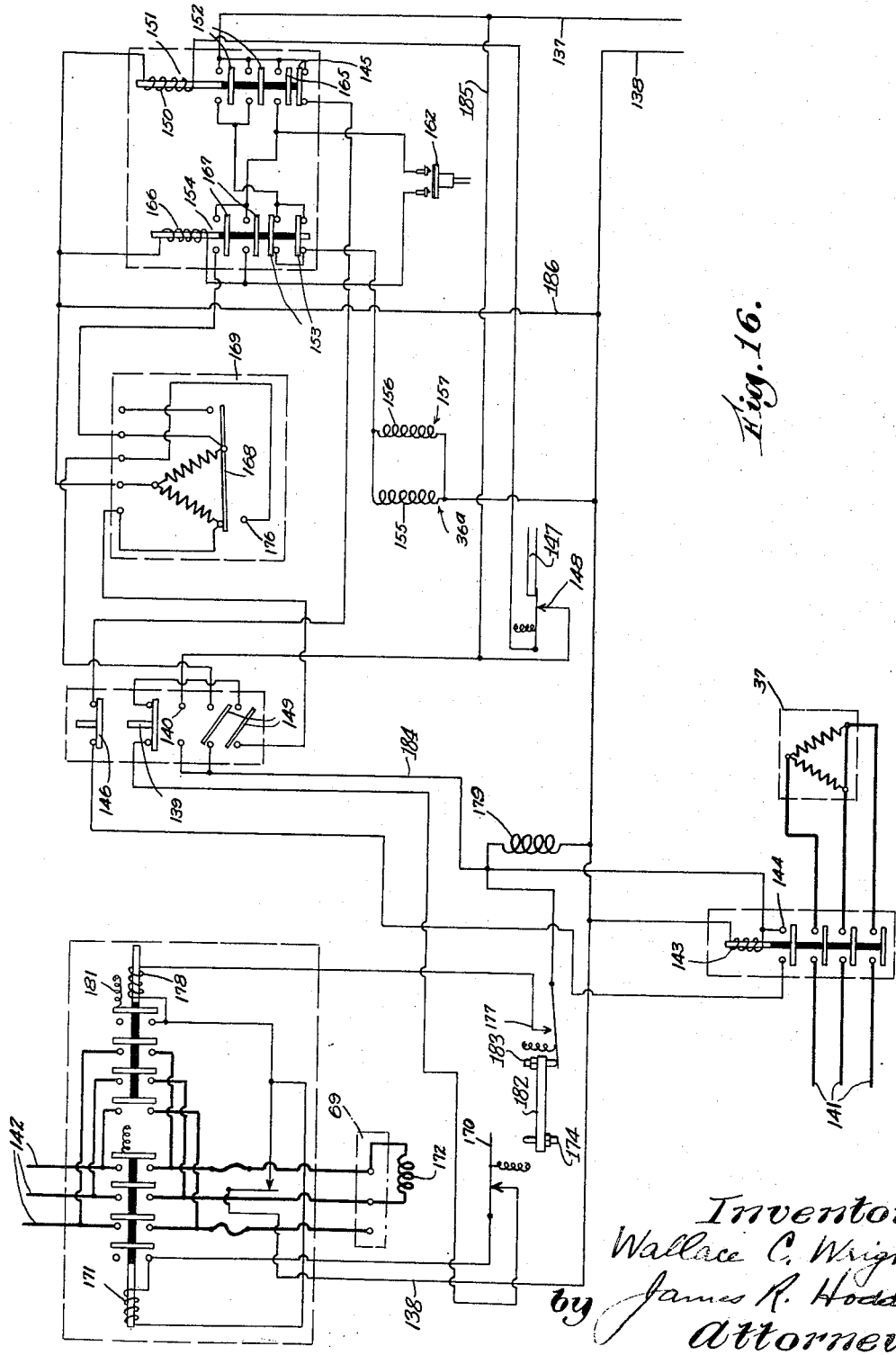

Fig. 15 (see sheet bearing Fig. 8) is a vertical section through the structure intersected by line 15—15 in Fig. 1, which structure includes an auxiliary chamber for liquid, a float therein, and an electrical circuit closer operable by the float to initiate the operation of a timing device; and Fig. 16 is a wiring diagram of the electrical circuits by which the various steps or operations included in a cycle are automatically brought about when the cycle is once initiated.

Figure 2:
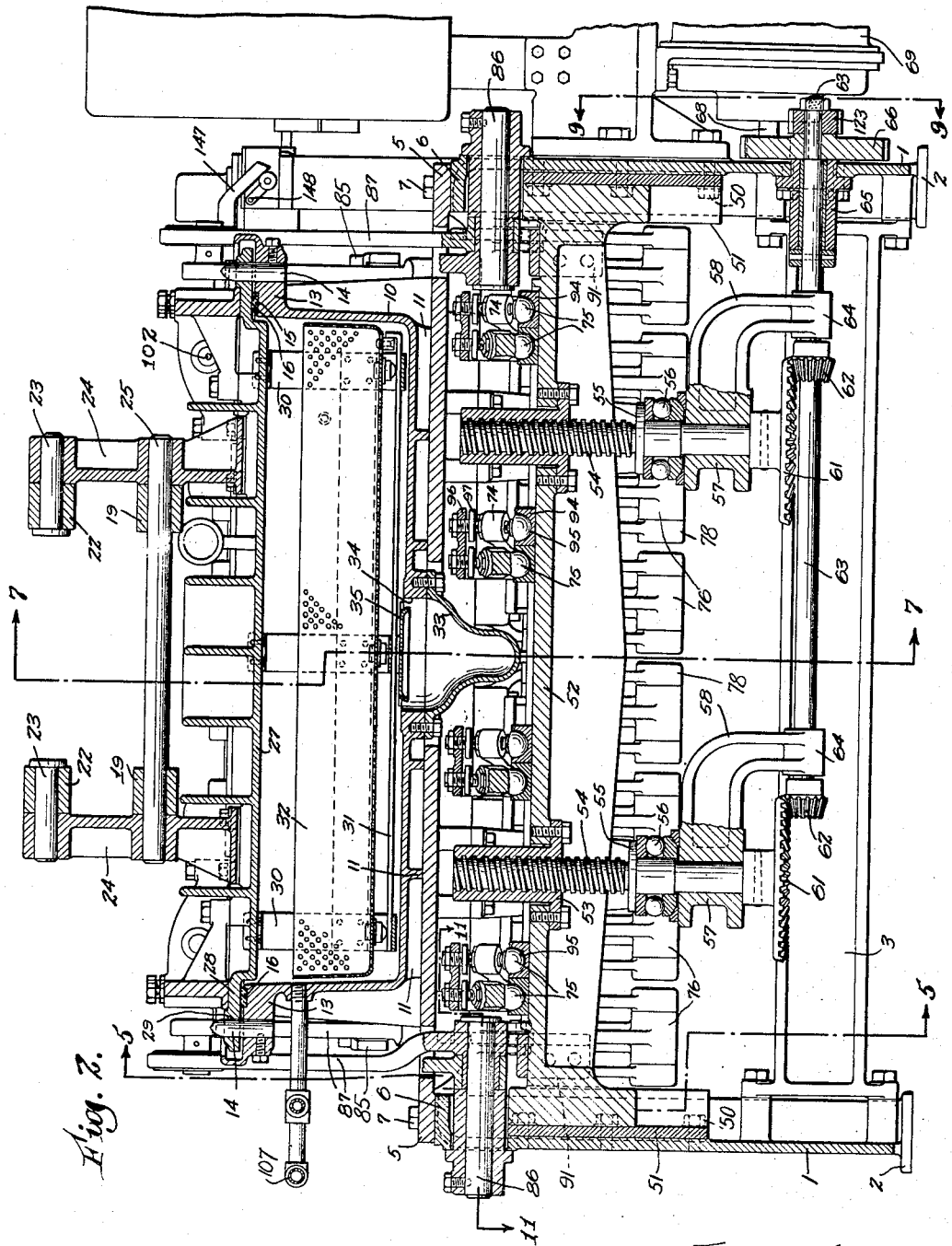
Fig. 2 is a longitudinal vertical section therethrough in the plane indicated by line 2—2 of Fig. 1, the parts being in their operative positions as when the work is undergoing treatment.

The main frame of the illustrated machine comprises two upstanding end pieces 1 provided with floor bearings 2, connecting rails 3 and 4 and a bed-plate or platform 5. As shown in Fig. 2, the ends of the platform 5 rest upon the flanges 6 of the end pieces 1 and are affixed thereto by bolts 7. A pressure-sustaining treatment receptacle 10, the bottom of which is provided with reinforcing ribs 11, stands on the platform 5 and is secured thereto by bolts 8 (Fig. 6) that extend through reinforcing ribs 9 of the platform and into tapped bosses 12 on the bottom of the receptacle.

The treatment receptacle 10 is of a size and shape to receive a work-container 32, as shown in Figs. 2 and 7. This container is supported and carried by an underslung carrier comprising straps 30 and 31 suspended from the bottom of a closure 27 adapted to cooperate with the receptacle 10 to provide a pressure-tight chamber. Accordingly, the rim of the receptacle 10 is provided with a flange 13 having a groove 15 to receive a gasket 16 of resilient material on which the flange 28 of the closure may be seated. Preferably the flange 28 is provided at intervals with holes 29 to cooperate with pointed dowels 14 projecting upwardly from the flange 13 of the receptacle to register the closure thereon.

To provide for carrying the closure 27 and the work-supporting means to and from the treatment receptacle, the closure is provided with two brackets 24 affixed thereto by bolts 26 (Figs. 1 and 7). A tie-rod 25 connecting the brackets provides a pivotal connection for a pair of carrying arms 19, while pins 23 provide pivotal connections between the brackets and a pair of links 22. The arms 19 are arranged to swing up and down on a fulcrum provided by a tie-rod 18 connecting a pair of brackets 17 projecting upwardly from the platform 5 and bolted thereto. These brackets are also connected with the links 22 by pivot pins 21. The arms 19 and the links 22 maintain the closure 27 in a horizontal position while carrying it up and down.

The arms 19 are united by connecting webs 20 and 41, the latter being provided with a bracket 40 for connection with an operating plunger of an electro-hydraulic operating unit 37. The plunger comprises parallel rods 38 and a central member 39 connecting them and having a pivotal connection with the bracket 40. The lower end of this hydraulic unit is pivotally connected to a member 42 mounted on a support 43. The effect of the unit 37 is to raise the closure 27 and the work carried thereby to their initial positions shown in Fig. 6, and so long as the operating unit continues in operation it will maintain the closure in this position.

The load including the closure and the parts for operating it is partially but not wholly balanced by a pair of compression springs (Fig. 7) contained in tubes 44 and exerting their force upwardly against plungers 47 arranged to operate against blocks 48 carried by the web 41. The lower ends of the springs 45 are seated on members 136 capable of being adjusted by bolts 135 to regulate the applied force of the springs. The springs retard the descent of the load when the operation of the unit 37 is discontinued, while the weight of the load causes the closure normally to descend to its operative position on the mouth of the treatment receptacle.

Figure 3:
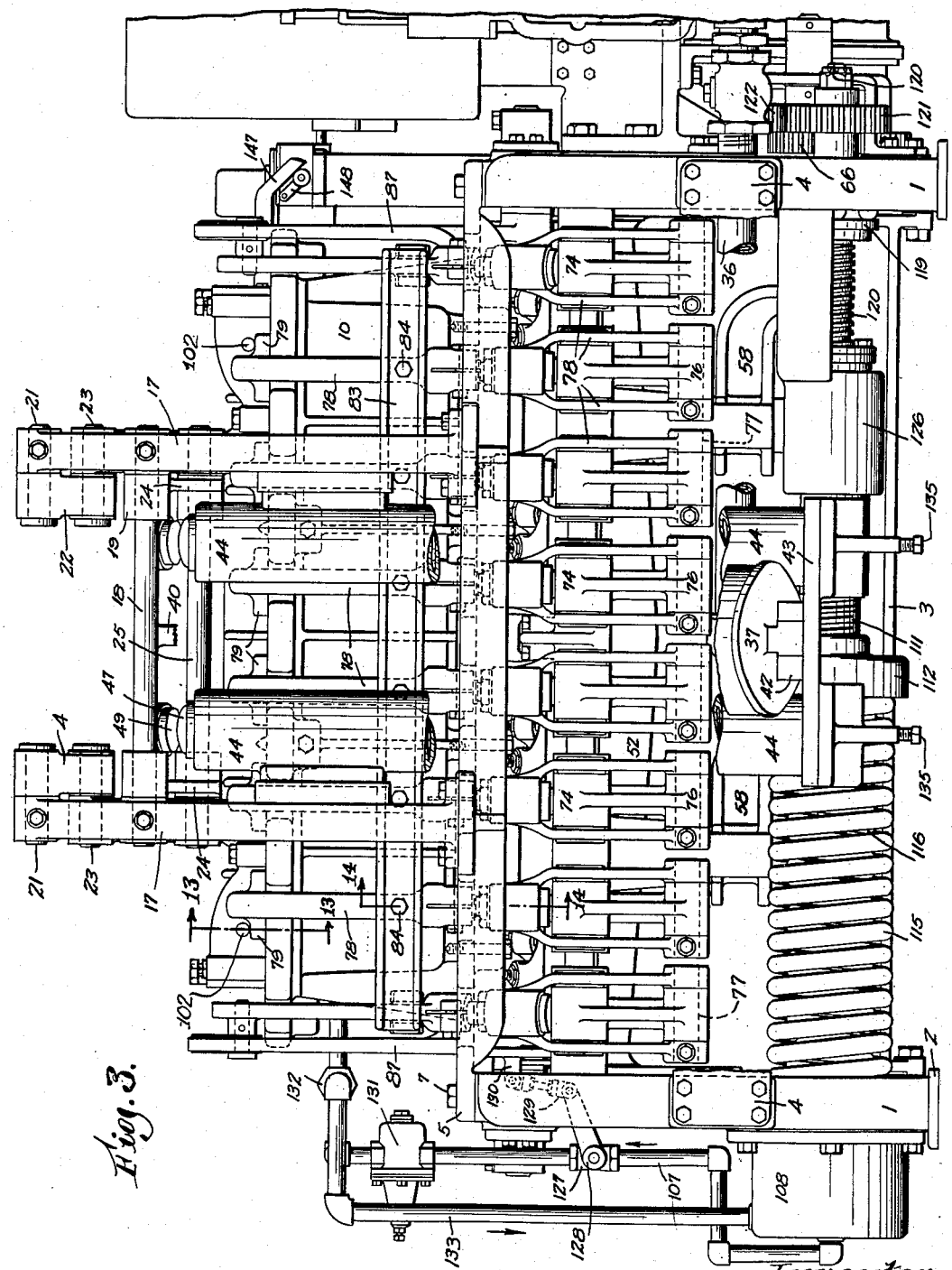
Fig. 3 is a rear elevation of the machine in which certain parts are represented as broken away.
Figure 4:
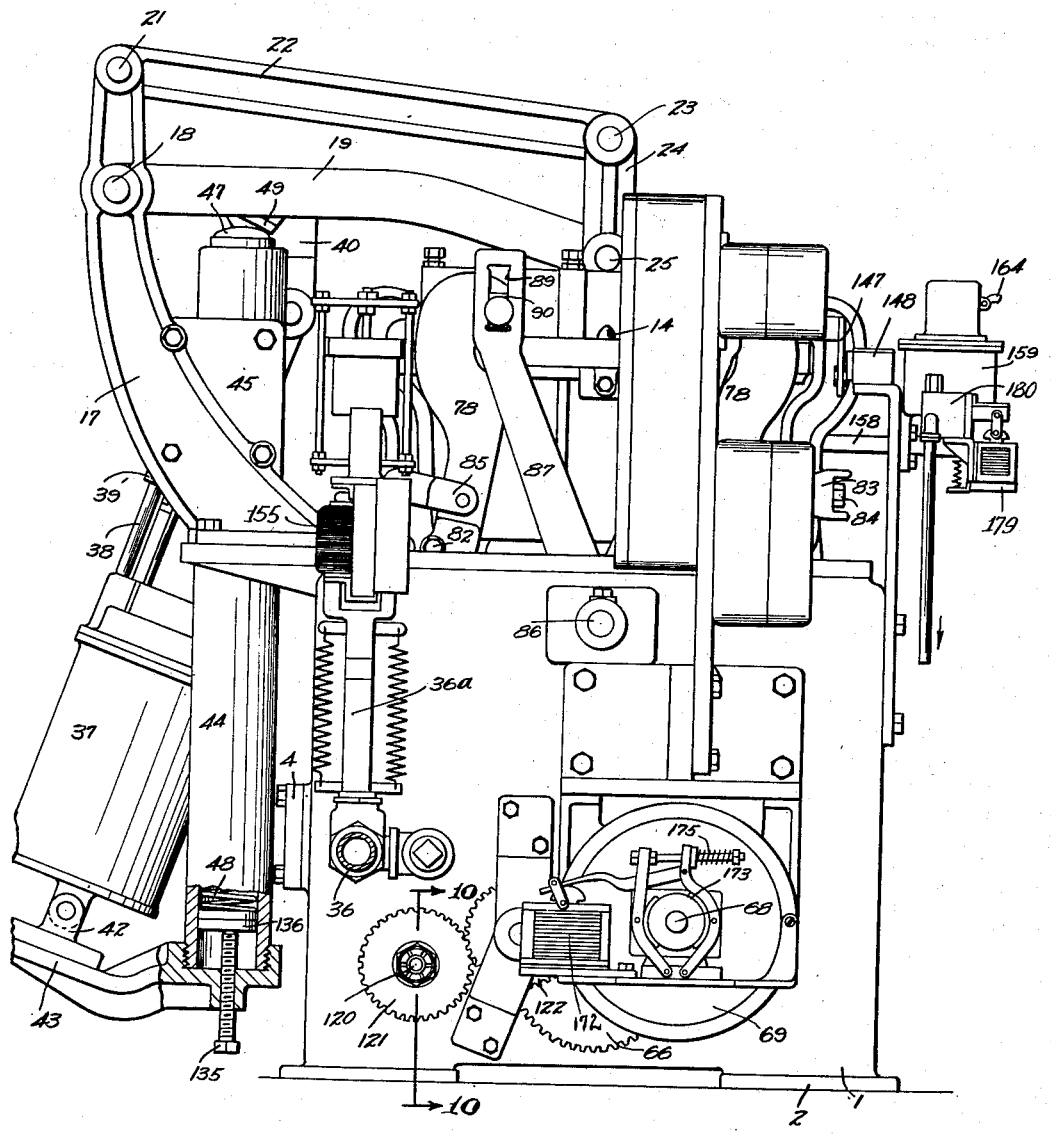
Fig. 4 is an end elevation as viewed from the right to the left of Fig. 1.
Figure 5:
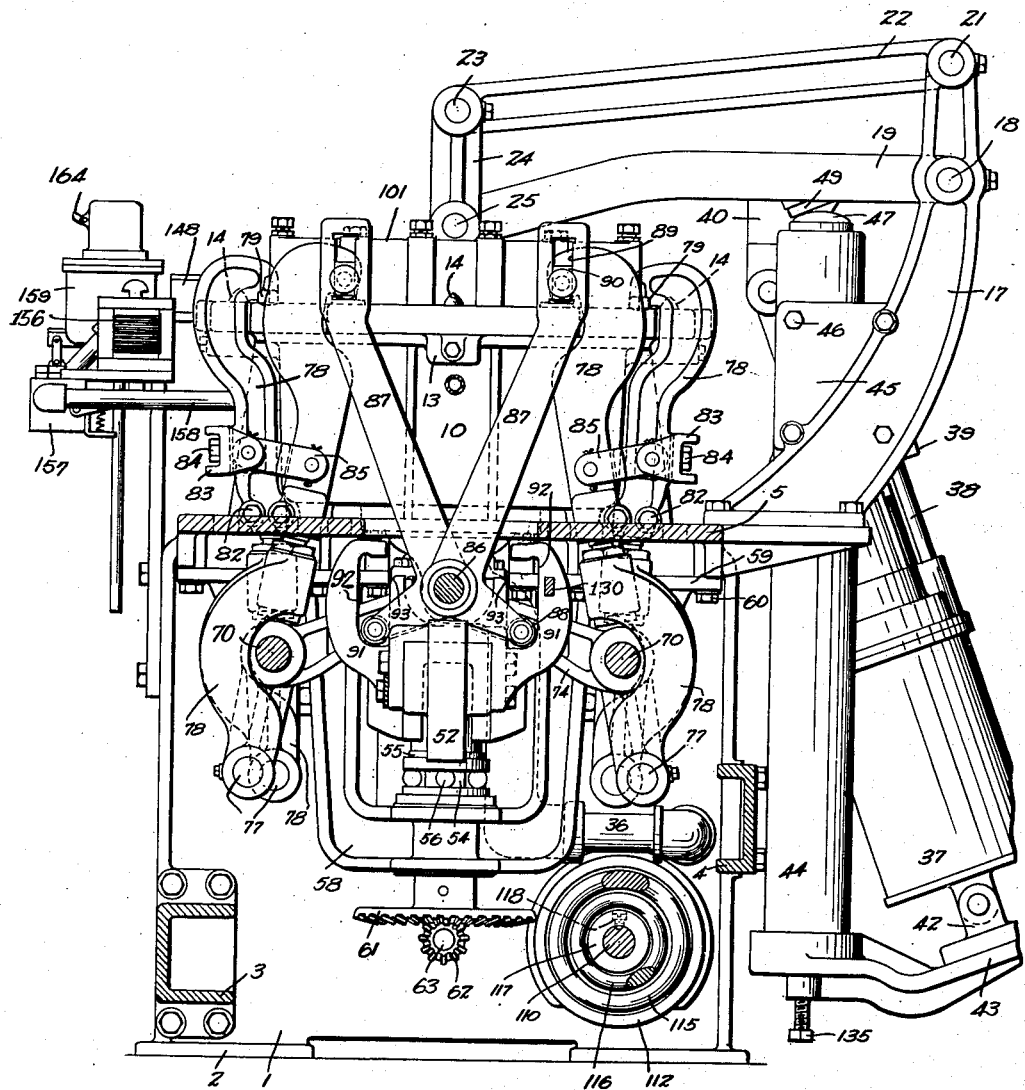
Fig. 5 is an end elevation, partly in section, as indicated by line 5—5 of Fig. 2, the direction of view being opposed to that of Fig. 4.

Water for treating the work is supplied to the receptacle 10 from any suitable source by a pipe 36 (Figs. 1, 4 and 5). As shown by dotted lines in the latter figure, a portion of the supply pipe extends upwardly under the receptacle 10. The connection between this pipe and the receptacle is formed by a fitting 33 (Fig. 2) bolted to the bottom of the receptacle in register with an opening 34 therein, a baffle-plate 35 being arranged in the opening 34 to break the force of the inflowing water. When the closure descends and is about to be seated on the receptacle, a finger 147 carried thereby (Figs. 1, 2, 3, 4, 6 and 16) depresses a circuit closer 148 whereby a relay switch 151 is operated to supply current to an electrically operated solenoid valve 36a located in the pipe line 36. The pipe line is thus opened to supply water to the receptacle.

As shown in Fig. 16 the winding 155 of the supply valve 36a is connected in parallel with a corresponding winding 156 of an outlet valve 157, the latter being arranged in a pipe line 158 (Figs. 1, 6 and 7) arranged to conduct water from the receptacle 10 at an intermediate level thereof to an auxiliary receptacle 159 partly above and partly below the level of the mouth of the treatment receptacle. The valve 157 is therefore opened simultaneously with the supply valve 36a. Consequently, as the water level in the receptacle 10 rises above the receiving end of the pipe line 158 some of the water flows through this pipe line and fills or partially fills the auxiliary receptacle 159, which, at this stage, cannot discharge water through its draining valve 180 hereinafter described.

When the water level rises sufficiently to fill the receptacle 10 it raises a float 160 in the receptacle 159. This float is affixed to a stem 161 (Fig. 15), the upper end of which is provided with an electrical contact plate 162 arranged to close a circuit comprising two stationary terminals 163 (Fig. 15). This circuit operates a relay switch 154 by which the contacts 153 are moved to break the circuit that has been holding the valves 36a and 157 open. As shown in Fig. 15, a manually operable lever 164 is arranged to raise the contact plate 162 and may be manipulated for that purpose in the event that the float 160 fails to do so.

The circuit closer 162 also initiates automatic operation of power driven means by which the closure is secured in pressure-tight relationship to the receptacle 10 and by which the pressure of the water now confined in the receptacle is raised to speed the tempering of the work. For these purposes the apparatus is provided with an electric motor 69 (Figs. 2, 4 and 16) the shaft 68 of which carries a driving pinion 67 (Fig. 9) by which a train of gears 66, 123, 122 and 121 is operated. The gears 66 and 123 are both affixed to a shaft 63 by which rotation is imparted to mechanism for securing the closure to the receptacle 10, while the gear 121 is affixed to a shaft 120 by which other mechanism (Fig. 10) is operated to raise the pressure of the water in the receptacle.

Describing first the mechanism for securing the closure, (see Figs. 2 and 6) the shaft 63 is journaled in bearings 64, 64 and 65 and is provided with two bevel gears 62 that drive respectively bevel gears 61 affixed to vertical screw-shafts 54. The bearings 64 and the bearings 57 for the shafts 54 are formed in hangers 58 suspended from the bed-plate 5 (Figs. 5, 6 and 7), the upper portions 59 of the hangers being affixed to the bed-plate 5 by bolts 60. The screw-shafts 54 cooperate with nuts 53 affixed to a vertically movable beam 52 the ends of which are arranged to slide in guides 51 (Fig. 8) secured to the frame pieces 1 by bolts 50. Thrust bearings 56 (Fig. 2) seated on the bearings 57 sustain the load on the shafts 54 which, for that purpose, are provided with supporting collars 55.

Figure 6:
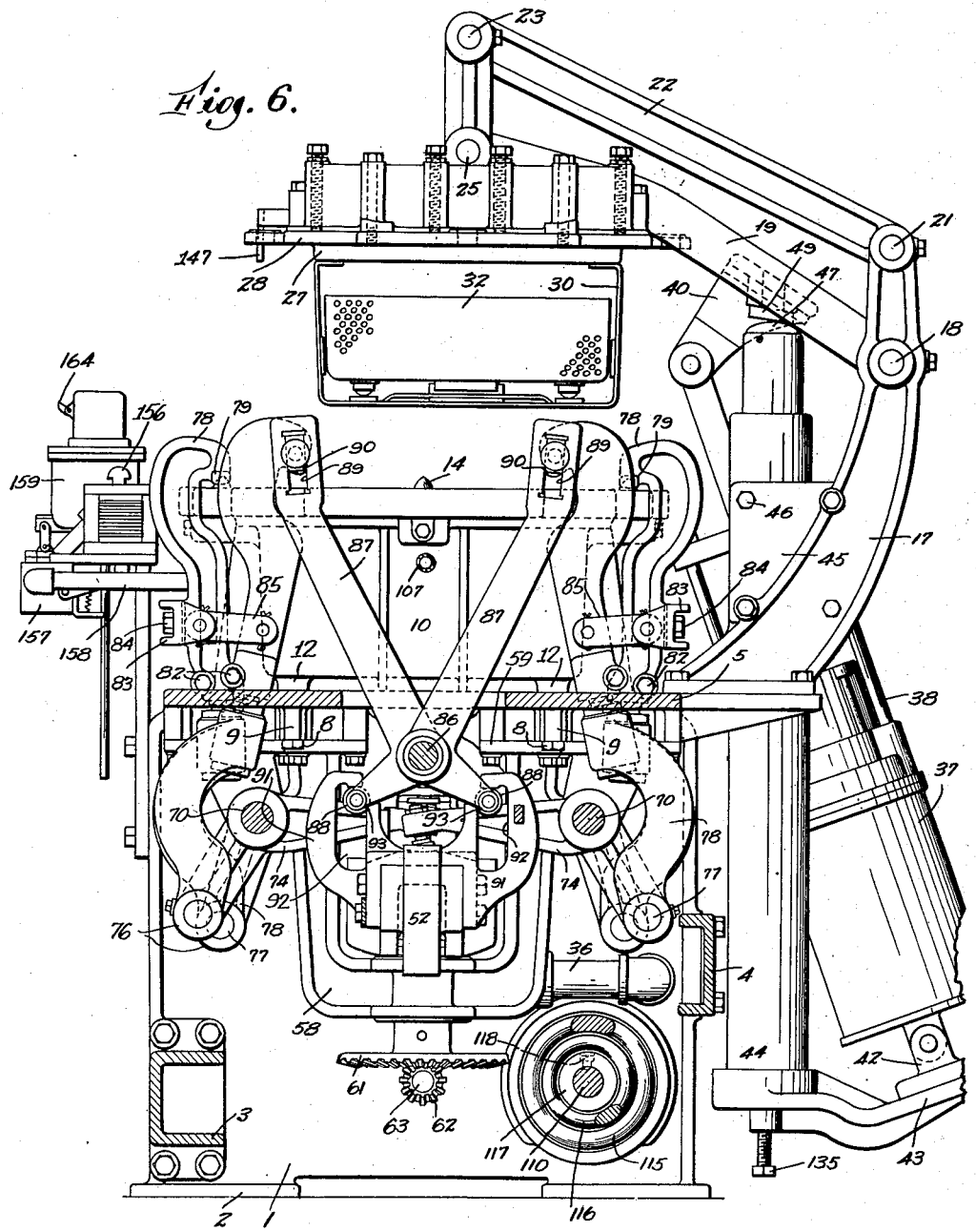
Fig. 6 is a view similar to Fig. 5 except that the parts stand in their initial positions as at the termination of a cycle of operations.

The beam 52 stands initially at its lower limit of travel, as shown in Fig. 6, and remains in that position until the receptacle 10 has been filled with water as above described. Then, when operation of the motor 69 is initiated by the circuit closer 162, the beam 52 is raised by the screw-shafts 54 until it reaches its upper limit of travel as shown in Figs. 2, 5 and 7. The first stages of this upward movement are utilized to shift a plurality of clamping jaws 78 from their inoperative positions (Fig. 6) to their operative positions over the margin of the closure 27, but the latter stages are utilized to depress the jaws 78 and thereby effect pressure-tight relationship between the closure and the receptacle 10.

As shown in Fig. 1, the jaws 78 are arranged in two series at opposite sides of the longitudinal median line of the closure, those of one series being movable in one direction to their operative positions, while those of the other series are movable in the opposite direction. Each jaw is provided with lateral projections 79 arranged to bear on the margin of the closure. Moreover, as shown in Fig. 14, each jaw comprises an upper section, a lower section and an adjustable connecting stud 80 by which the effective length of the jaw may be regulated so that all the jaws may be coordinated to bear with equal pressure on the closure. The stud 80 is screwed into a tapped and split socket 81 in the upper section, the socket being provided with a clamping bolt 82 by which it may be contracted to grip the stud.

The lower ends of the jaws are mounted on individual floating pivot-pins 77 (Figs. 3, 5 and 6) carried by individual bell-crank levers 74 arranged in two series on two horizontal supporting rods 70. The ends of these rods (see Fig. 8) are arranged in supporting sockets 71 formed on plates 72 affixed by bolts 73 to the end pieces 1 of the frame. The arms 76 (Figs. 2, 3 and 6) that carry the pivot-pins 77 are so related to the fulcrum rods 70 and to the jaws 78 as to operate with the effect of toggles when they carry the pins 77 to and from their dead-center positions (Fig. 7) at which they apply the maximum clamping force.

The other arm of each lever 74 is provided with a stud having a spheroidal head 75 (Figs. 2 and 7). These heads all lie virtually in the median vertical plane of the assemblage and are embedded in socket members 94 seated on the upper face of the beam 52 and capable of limited sliding movement thereon.

When the parts stand in their initial positions, as shown in Fig. 6, the two series of jaws 78 are widely separated by bell-crank levers 87 of which there is one at each end of each series. As shown in Figs. 2 and 6, the levers 87 are arranged in pairs and each pair is mounted on a fulcrum pin 86. These pins are coaxial and are secured in fittings bolted to the frame piece 1. An operating connection between each lever 87 and one of the jaws 78 is provided by a block 80 mounted on the jaw and arranged to slide in a slot 89 in the lever. The lower end of each lever 87 is provided with a roll 88 arranged to engage an individual operating cam 93, a pair of such cams being formed on a saddle 91 bolted to the vertically movable beam 52.

In operation, when the beam 52 rises from its initial position shown in Fig. 6, the first stages of its travel cause the cams 93 to operate the levers 87 whereby the jaws 78 (connected in gang relation as hereinafter described) are shifted to their operative positions. As the beam 52 continues to rise the levers 87 remain stationary by virtue of vertical slots 92 formed in the saddles 91 to provide a range of lost motion, but the beam 52 nevertheless operates the bell-crank levers 74 whereby the jaws 78 are all depressed with a toggle action to apply downward force of the closure against the mouth of the receptacle 10.

The intermediate jaws 78 of each series are connected in gang relation by a horizontal beam 83 and connecting bolts 84, the ends of the beams being connected by links 85 to the four terminal jaws 78.

When the beam 52 reaches the upper limit of its travel it stops the operation of the motor 69 from which it receives its motion, the stopping of the motor being caused by a circuit breaker 170 and an operating pin 174 carried by a finger 182 bolted to the beam (Figs. 8, 11 and 16).

While the beam 52 is rising, the mechanism shown in Fig. 10 is operated to develop hydraulic pressure of high degree for speeding the tempering operation. This mechanism comprises a hydraulic cylinder 108 and a ram or piston 109 that receives its operating motion from the motor 69. The piston 109 stands initially in the position shown in this figure and the cylinder 108 is initially full of water supplied to it from the receptacle 10 through a pipe 133 (Figs. 1 and 3). A check-valve 132 in this pipe prevents flow from the cylinder 108 to the receptacle 10. When the piston 109 develops pressure of the water in the cylinder some of the water may flow to the receptacle 10 through a pipe 107, but the flow through this pipe is initially stopped by a valve 127 that remains closed until the closure 27 is tightly secured to the receptacle 10 but is automatically opened at the conclusion of the securing operation. For this purpose the arm 128 that operates the valve 127 is connected by a link 129 (Figs. 8 and 11) to a lug 130 projecting from one of the saddles 91 carried by the beam 52 (see Fig. 5). When, finally, the valve 127 is opened the hydraulic pressure now fully developed in the cylinder 108 is admitted to the receptacle 10, but before reaching the receptacle it must pass through a pressure-regulating valve 131 which may be adjusted to supply any desired pressure within the capacity of the means illustrated in Fig. 10.

The operating shaft 120 is provided with a screw portion with which a nut 119 cooperates. The nut is thus driven toward the cylinder 108 and carries a tubular plunger 111 in which it is nested. Rotation of the plunger is prevented by splines 125 in a sleeve 126 in which the plunger is arranged to slide, the sleeve being bolted to the adjacent frame piece 1, and the plunger having grooves 124 into which the splines project. The left-hand end of the plunger 111 has a telescopic connection with a rod 110 affixed to the hub 113 of the piston. The movement of the plunger 111 is utilized to compress two springs 115 and 116 nested one in the other, the plunger being provided with a header 112 for acting against the springs. A similar header 114 mounted on the hub of the piston applies the force of the springs to the piston. To prevent buckling of the springs the piston rod 110 is provided with a sleeve 117 affixed thereto by a set-screw 118.

By means of this mechanism, a powerful force is built up in the springs during the operation of securing the closure to the treatment receptacle, and the maximum hydraulic pressure thus developed in the cylinder 108 is admitted to the treatment receptacle through the pipe 107 and the supply valve 127 therein. The springs continue, of course, to maintain the high pressure in the treatment receptacle so long as they remain under compression, but after the conclusion of the pressure-tempering period they are relaxed by reverse rotation of the screw-shaft 120 to relieve the pressure in the treatment receptacle and to take back some of the water therefrom through the return pipe 133. This return flow is insured by suction when the piston 109 is retracted by the return movement of the plunger 111, the piston rod 110 having a head at its right-hand end by which the return of the plunger is rendered effective to retract the piston.

The length of time during which high pressure is maintained in the treatment receptacle is governed by a time relay 169 (Fig. 16), the arm 168 of which will drop to the contact member 176 at the conclusion of the allotted time and thereby establish other electrical circuits, one of which will set up reverse rotation of the motor 69, and another of which will energize a solenoid 179 by which a valve 180 (Figs. 1 and 4) is opened to drain water from the float chamber 159 (Fig. 15).

When reverse rotation of the motor 69 occurs it not only restores the hydraulic pressure generator shown in Fig. 10 to its initial position but it also returns the vertically movable beam 52 from its upper position (Figs. 2, 5 and 7) to its lower position (Fig. 6). As the beam descends, it closes the supply valve 127 (Fig. 3) and operates the bell-crank levers 74 to release the closure 27, the jaws or toggle members 78 being thereby raised and thereafter retracted beyond the rim of the closure to clear the path in which the closure will subsequently rise to the position shown in Fig. 6. To effect positive releasing movement of the bell-crank lever 74, the beam 52 is provided with plates 96 (Figs. 2 and 11) affixed thereto by bolts 99 and each of these plates is provided with strikers 97 arranged to act against the upper ends of two of the studs 75 carried by the levers.

During the early stages of the descent of the beam 52 from the position shown in Fig. 5, the retracting levers 87 remain stationary in consequence of the lost motion afforded by the slots 92 in the saddles 91, but finally the rolls 88 are engaged and depressed by overhanging extremities of the saddles and the levers 87 are thereby operated to retract the jaws as shown in Fig. 6.

As shown in Fig. 1, the closure is provided with four bosses 100 that project horizontally from reinforcing ribs 101. Each of these bosses contains a horizontally movable latch 102 of the construction shown in Fig. 13. The latch is normally projected by a spring 106 and is provided with a key-way 105 into which a key 104 projects to prevent turning movement. The outer end of the latch has an inclined cam face 103. These latches are arranged to be engaged by lateral projections 79 of four of the jaws 78. When the jaws move to their operative positions they merely push back the latches by their engagement with the faces 103 without producing any other effect, but when the jaws reach their operative positions the latches project over the portions 79 as shown in Fig. 13. Thereafter, when the jaws are raised during the first stages of releasing the closure the portions 79 operate as lugs to lift the closure and thereby break the seal formed by the gasket 16 and the flange 28.

When the closure is released as above explained, the operation of the motor 69 is automatically interrupted by a circuit breaker 177 (Figs. 8 and 16) arranged to be operated by a pin 183 carried by the finger 182 on the beam 52.

To insure prompt stoppage of the motor 69 whenever its operating circuit is opened, its shaft 68 (Fig. 4) is provided with a brake 173 normally applied by a spring 175 but arranged to be relaxed by a solenoid 172 that is energized only while operating current is being supplied to the motor.

When the arm 168 of the timing device drops to the contact 176, it also supplies operating current to the solenoid 143 of the relay by which operating current is supplied to the hydraulic unit 37, with the result that this unit retracts the closure to its initial position shown in Fig. 6. The cycle of operations is thus completed and the closure remains in its retracted position until the next succeeding cycle is initiated by manual operation of the circuit breaker 146.

Referring to the wiring diagram in Fig. 16 for a summary of a cycle of operations, it is to be borne in mind that when the apparatus is not in use and no current is being supplied thereto from any source, the force of gravity will cause the closure 27 to be seated on the treatment receptacle 10 because under such conditions the electro-hydraulic unit 37 is not effective to support the closure or any load of which it is a part. For purposes of description, this normal position of the closure is not to be regarded as the final position or the initial position of a cycle of operations. On the contrary, the initial position for a cycle of operations requires the closure to be retracted as shown in Fig. 6, in which position it affords the attendant an opportunity to place a work container 32 in or on the work-supporting means 30. Consequently, to raise the closure from its normal position on the receptacle to its initial position shown in Fig. 6 requires a preliminary operation of the unit 37. This may be accomplished by manual operation of a push-button 139.

Current for operating the unit 37 is supplied from any suitable source by wires 141, current for operating the motor 69 and the brake solenoid 172 may be supplied from any suitable source by wires 142 and current for the various controlling circuits may be supplied from any suitable source by wires 137 and 138. When the above-described preliminary operation of the unit 37 is required manual operation of the push-button 139 closes a controlling circuit comprising the supply wire 137, switch 140, solenoid 143 and return wire 138. Thus, the solenoid 143 is energized to operate a relay in the operating circuit 141 whereby operating current is supplied to the unit 37. Even though the push-button 139 is released after operating the solenoid 143, the relay will maintain the solenoid in circuit as follows: supply wire 137, circuit breaker 145, circuit breaker 146, relay switch 144, solenoid 143, and return wire 138. The unit 37 will therefore continue in operation to maintain the closure 27 in its initial position.

When the work to be treated is in readiness to be carried into the treatment receptacle, the attendant will operate the circuit breaker 146, thus de-energizing the solenoid 143 and permitting the relay to disconnect the unit 37 from its source of operating current. The force of gravity now causes the closure to descend to its operative position on the mouth of the treatment receptacle. The finger 147 carried by the closure finally operates the circuit closer 148 in consequence of which the valve 36a is opened to supply water to the receptacle, and the valve 157 (Figs. 1 and 5) is opened to permit some of the water in the receptacle to flow to the float chamber 159.

The circuit closer 148 is in a circuit comprising supply wire 137, wire 185, closer 148, solenoid 150 of a relay 151, wire 186 and return wire 138. The solenoid 150, now being energized operates the relay 151 and remains energized so long as the closure remains on the receptacle.

Operation of the manual circuit breaker 146 also closes the automatic snap switches 149 to prepare other circuits for use. When the treatment receptacle is full of water the float 160 (Fig. 15) causes the contact 162 to close a circuit that enables the valves 36a and 157 to close, initiates forward rotation of the motor 69 and the operation of the timing device 169. The circuit controlled by the float comprises supply wire 137, relay switch 165, closer 162, solenoid 166 of a relay 154, wire 186 and return wire 138. The relay 154 now causes the switches 153 to de-energize the valve solenoids 155 and 156, and supplies operating current to a solenoid 171 (upper left of the diagram) through the following circuit: supply wire 137, relay switch 165, upper switch 167, arm 168 of the timing device, switch 149, circuit breaker 139, circuit breaker 170, solenoid 171 and return wire 138. The timing device being permanently connected with the return wire 138 by wire 186 is also set in operation. The energizing of the solenoid 171 operates a relay switch by which operating current is supplied to the motor 69 from the supply wires 142. At this stage the motor 69 raises the beam 52 to secure the closure and also operates the pressure-developing mechanism shown in Fig. 10. When the closure is tightly secured the pin 174 carried by the finger 182 operates the circuit breaker 170 which de-energizes the solenoid 171. The motor 69 is thus arrested, but the timing device 169 remains in circuit to postpone the next subsequent circuit alteration until the allotted time for pressure-tempering has expired.

When the timing device has run its course, the arm 168 thereof drops to the contact 176, thereby causing relief of pressure in the treatment receptacle and releasing the closure, both by reverse rotation of the motor 69. When the arm 168 of the timing device drops the reversing solenoid 178 is energized by a circuit comprising supply wire 137, relay switch 165, upper relay switch 167, arm 168, contact 176, switch 149, wire 184, circuit breaker 177 (now closed), solenoid 178 and return wire 138. The solenoid 178 now closes a relay switch by which operating current is supplied from the wires 142 to effect reverse rotation of the motor 69. When the closure is fully released, a pin 183 carried by the finger 182 operates the circuit breaker 177 thereby de-energizing the solenoid 178 to permit a spring 181 to disconnect the motor 69 from its source of operating current.

The circuit established by the dropping of the arm 168 also supplies operating current through the upper switch 149 and wire 184 to the solenoid 179 and the solenoid 143 both of which are connected in parallel to the return wire 138. The solenoid 143 is thus energized to operate the relay by which operating current is supplied to the electro-hydraulic unit 37 from the supply wires 141, and the unit 37 is thus operated to complete a cycle of operations by retracting the closure and the work to their initial position.

As the closure rises it permits the circuit closer 148 to open, thereby de-energizing the solenoid 150 (upper right) of the relay 151 which, on being thus restored to its initial position, causes the switch 165 to open not only the circuit comprising the upper switch 167, the arm 168 and the upper switch 149, but also the circuit comprising the lower switch 167, solenoid 166, the timing device 169 and the lower switch 149.

Moreover, when the solenoid 179 is energized by the dropping of the arm 168 it opens the draining valve 189 (Figs. 1 and 4). Consequently, as the water in the float chamber 159 (Fig. 15) is drained therefrom, the float retracts the contact 162 from the stationary contacts 163.

Having described the invention, what is claimed as new and desired to be secured by Letters Patent of the United States is:

1. An apparatus for treating articles comprising a pressure-sustaining treatment receptacle, a removable closure therefor provided with means for supporting the work to be treated, controllable means for supplying a fluid under pressure to the receptacle, a timing device, and automatic power-operated means controlled by said timing device to retract said closure and the work-supporting means from the receptacle.

2. An apparatus for treating articles comprising a pressure-sustaining treatment receptacle, a removable closure therefor, controllable means for supplying a fluid under pressure to the receptacle, means operable automatically to turn off the supply of fluid through said controllable means, a timing device, and automatic power-operated means controlled by said timing device to retract said closure from the receptacle.

3. An apparatus for treating articles with liquid comprising a pressure-sustaining treatment receptacle, a removable closure therefor provided with means for supporting the work to be treated, controllable means for supplying a liquid under pressure to the receptacle, a timing device, means controlled by said timing device to relieve the pressure of the liquid in the receptacle at the termination of a certain time interval, and automatic power-operated means also controlled by said timing device to retract said closure and the work-supporting means from the receptacle.

4. An apparatus for treating articles with liquid comprising a pressure-sustaining treatment receptacle, a removable closure therefor provided with means for supporting the work to be treated, means for supplying a liquid under pressure to said receptacle, said supplying means including an initially closed valve, power-operated means by which said valve is opened in consequence of placing said closure in its operative position on the receptacle, a timing device, and power-operated means controlled by said timing device to retract said closure and the work-supporting means from the receptacle.

5. An apparatus for treating articles with a liquid comprising a treatment receptacle, a removable closure therefor provided with means for supporting the work to be treated, means for securing the closure to the receptacle, means for supplying a fluid to the receptacle, a timing device, and power-operated means controlled by said timing device for operating said securing means to release the closure and for moving the closure from the receptacle.

6. An apparatus for treating articles with a liquid comprising a pressure-sustaining treatment receptacle, a removable closure therefor, means including a valve for supplying a liquid to the receptacle, means operable automatically to open said valve in consequence of placing said closure on the receptacle, means controlled by the rise of liquid in the receptacle to close said valve, power-operated means also controlled by the rise of liquid in the receptacle to raise the pressure of that liquid, a timing device, means controlled by said timing device to relieve the pressure in the receptacle at the conclusion of a certain length of time, and power-operated means also controlled by said timing device to retract said closure from the receptacle.

7. An apparatus for treating articles with liquid comprising a pressure-sustaining treatment receptacle, a removable closure therefor, means including a valve for supplying liquid under pressure to said receptacle, means operable by closing movement of said closure to open said valve, means operable by the liquid supplied to said receptacle to close said valve, a timing device arranged to be set in operation by the liquid supplied to the receptacle, and automatic power-operated means controlled by said timing device to retract said closure from the receptacle at the termination of a certain length of time.

8. An apparatus for treating articles with liquid comprising a pressure-sustaining treatment receptacle, a removable closure therefor, means including a valve for supplying liquid under pressure to said receptacle, means operable by closing movement of said closure to open said valve, means operable by the liquid supplied to said receptacle to close said valve, a timing device arranged to be set in operation by the liquid supplied to the receptacle, and automatic power-operated means arranged to be set in operation by the liquid supplied to the receptacle to raise the pressure thereof, said automatic power-operated means being controlled by said timing device to relieve the pressure in the receptacle at the termination of a certain length of time.

9. An apparatus for treating articles with a liquid comprising a pressure-sustaining treatment receptacle, a retractory closure therefor, means for securing said closure in pressure-tight relationship to the receptacle, means for supplying a liquid to the receptacle, means for raising the pressure of the liquid confined in the receptacle, timing means, and means controlled by said timing means to relieve the pressure in the receptacle at the conclusion of a certain length of time.

10. An apparatus for treating articles comprising a pressure-sustaining treatment receptacle, a removable closure therefor, means for securing said closure in pressure-tight relationship to the receptacle, power-operated means for supplying a fluid under pressure to the receptacle, and power-operated means arranged to relieve the fluid pressure in the receptacle and to operate said securing means to release said closure.

11. An apparatus for treating articles comprising a pressure-sustaining treatment receptacle, a removable closure therefor, means for securing said closure in pressure-tight relationship to the receptacle, power-operated means for supplying a fluid under pressure to the receptacle, a timing device, and power-operated means controlled by said timing device to relieve the fluid pressure in the receptacle and operate said securing means to release said closure.

12. An apparatus for treating articles comprising a pressure-sustaining treatment receptacle, a retractory closure therefor, means for supplying a treating fluid under pressure to the receptacle, and power-operated means arranged to secure said closure in pressure-tight relationship to the receptacle and thereafter automatically to raise the pressure of the fluid in the receptacle.

13. An apparatus for treating articles comprising a pressure-sustaining treatment receptacle, a retractory closure therefor, means for supplying a treating fluid under pressure to the receptacle, power-operated means arranged to secure said closure in pressure-tight relationship to the receptacle and to raise the pressure of the fluid in the receptacle, and a timing device by which said power-operated means are controlled to relieve the pressure of the fluid and release said closure at the conclusion of a certain length of time.

14. An apparatus for treating articles comprising a pressure-sustaining treatment receptacle, a removable closure therefor provided with means for supporting the work to be treated, means to clamp the closure against the receptacle, means to supply a fluid to the receptacle, means to supply additional fluid under pressure to the receptacle, means to maintain the pressure within the receptacle for a predetermined length of time and to relieve such pressure at the termination of that time, means operable automatically to move said clamping means to release the closure, and means operable automatically to retract the closure and the work-supporting means from the receptacle.

15. An apparatus for treating articles comprising a pressure-sustaining treatment receptacle, a removable closure therefor provided with means for supporting the work to be treated, means to clamp the closure against the receptacle, means to supply a fluid to the receptacle, means to supply additional fluid under pressure to the receptacle, means to maintain the pressure within the receptacle for a predetermined length of time and to relieve such pressure at the termination of that time, means operable automatically to move said clamping means to release the closure, and means on the closure arranged to cooperate with said clamping means during the releasing movement thereof to raise the closure and the work-supporting means.

16. An apparatus as defined in claim 15 comprising supplemental means operable automatically to retract the closure and the work-supporting means clear of the receptacle.

17. An apparatus as defined in claim 15 in which the means on the closure for cooperating with the clamping means comprises a plurality of spring-pressed members for effecting the initial raising of the closure.

18. In an apparatus for treating articles, a pressure-sustaining treatment receptacle, a removable closure therefor, a plurality of toggle mechanisms each including a member arranged to clamp the closure against the receptacle, means by which said toggle mechanisms are supported independently of said closure, and means operable automatically to move said clamping members to and from cooperative relation with the closure and also to impart clamping movement and releasing movement to said members.

19. In an apparatus as defined in claim 18, means carried by the closure to be engaged and moved by said clamping members to separate the closure from the receptacle incidentally to the releasing movement of the clamping members.

20. An apparatus for treating articles with a liquid comprising a receptacle and a removable closure therefor provided with means for supporting the work to be treated, said receptacle and closure being constructed to form a pressure-tight treatment chamber, controllable means for altering the pressure of the liquid in said receptacle, a timing device, and automatic means controlled by said timing device to retract said closure and the work-supporting means from the receptacle.

21. An apparatus for treating articles with a liquid comprising a receptacle and a removable closure therefor provided with means for supporting the work to be treated, said receptacle and closure being constructed to form a pressure-tight treatment chamber, controllable means for altering the pressure of the liquid in said receptacle, automatic means by which an abnormal pressure in the receptacle is relieved and by which said closure and the work-supporting means are retracted from the receptacle, and a timing device by which said automatic means are controlled.

WALLACE C. WRIGHT.